(12) United States Patent
Lee et al.

(10) Patent No.: US 8,655,646 B2
(45) Date of Patent: Feb. 18, 2014

(54) APPARATUS AND METHOD FOR DETECTING NAMED ENTITY

(75) Inventors: Jae-won Lee, Seoul (KR); In-ho Kang, Yongin-si (KR); Jeong-su Kim, Yongin-si (KR); Hae-chang Rim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1576 days.

(21) Appl. No.: 11/498,050

(22) Filed: Aug. 3, 2006

(65) Prior Publication Data

US 2007/0100814 A1   May 3, 2007

(30) Foreign Application Priority Data

Oct. 28, 2005   (KR) ................ 10-2005-0102370

(51) Int. Cl.
  *G06F 17/27* (2006.01)
  *G06F 17/30* (2006.01)
  *G06F 17/28* (2006.01)

(52) U.S. Cl.
  USPC .......... 704/9; 704/7; 704/8; 704/10; 704/257; 704/E15.018

(58) Field of Classification Search
  USPC ........... 704/7, 9–10, 231, 240, 247, 251, 257, 704/E15.018
  See application file for complete search history.

(56) References Cited

U.S. PATENT DOCUMENTS

| | | | |
|---|---|---|---|
| 6,052,682 A | 4/2000 | Miller et al. | 707/3 |
| 6,925,601 B2* | 8/2005 | Moore et al. | 715/707 |
| 7,171,350 B2* | 1/2007 | Lin et al. | 704/9 |
| 7,212,963 B2* | 5/2007 | Li | 704/8 |
| 7,315,810 B2* | 1/2008 | Azzam et al. | 704/9 |
| 7,383,241 B2* | 6/2008 | Velipasaoglu et al. | 706/47 |

(Continued)

FOREIGN PATENT DOCUMENTS

| | | |
|---|---|---|
| JP | 2005-234214 | 9/2005 |
| KR | 2001-0037309 | 5/2001 |

(Continued)

OTHER PUBLICATIONS

Collins, Michael, "Ranking Algorithms for Named-Entity Extraction: Boosting and the Voted Perceptron," Proceedings of the 40th Annual Meeting of the Association for Computational Linguistics, Philadelphia, Jul. 2002, pp. 489.496.*

(Continued)

*Primary Examiner* — Pierre-Louis Desir
*Assistant Examiner* — Abdelali Serrou
(74) *Attorney, Agent, or Firm* — Staas & Halsey LLP

(57) ABSTRACT

An apparatus and method for detecting a named-entity. The apparatus includes a candidate-named-entity extraction module that detects a candidate-named-entity based on an initial learning example and feature information regarding morphemes constituting an inputted sentence, the candidate-named-entity extraction module providing a tagged sentence including the detected candidate-named-entity; a storage module that stores information regarding a named-entity dictionary and a rule; and a learning-example-regeneration module for finally determining whether the candidate-named-entity included in the provided sentence is a valid named-entity, based on the named-entity dictionary and the rule, the learning-example-regeneration module providing the sentence as a learning example, based on a determination result, so that a probability of candidate-named-entity detection is gradually updated.

18 Claims, 4 Drawing Sheets

(56) References Cited

U.S. PATENT DOCUMENTS

| | | | |
|---|---|---|---|
| 7,403,891 B2 * | 7/2008 | Park et al. | 704/10 |
| 7,412,093 B2 * | 8/2008 | Chung et al. | 382/181 |
| 7,542,894 B2 * | 6/2009 | Murata | 704/9 |
| 7,672,833 B2 * | 3/2010 | Blume et al. | 704/10 |
| 7,802,184 B1 * | 9/2010 | Battilana | 715/257 |
| 7,865,356 B2 * | 1/2011 | Weng et al. | 704/9 |
| 8,249,344 B2 * | 8/2012 | Viola et al. | 382/173 |
| 8,280,719 B2 * | 10/2012 | Miller | 704/9 |
| 2003/0191625 A1 * | 10/2003 | Gorin et al. | 704/1 |
| 2005/0049852 A1 * | 3/2005 | Chao | 704/9 |
| 2006/0015484 A1 * | 1/2006 | Weng et al. | 707/3 |
| 2008/0005090 A1 * | 1/2008 | Khan et al. | 707/4 |

FOREIGN PATENT DOCUMENTS

| | | |
|---|---|---|
| KR | 10-2004-0038559 | 5/2004 |
| KR | 10-2004-0050461 | 6/2004 |
| KR | 10-2004-0088360 | 10/2004 |
| KR | 10-2005-0039379 | 4/2005 |

OTHER PUBLICATIONS

Giridhar Kumaran "Text classification and named entities for new event detection", Proceedings of the 27th annual international ACM SIGIR conference on Research and development in information retrieval, 2004, pp. 297-304.*

Young-Min An "Korean part-of-speech tagging based on context information", Industrial Electronics, 2001. Proceedings. ISIE 2001, vol. 1, pp. 334-337.*

Solorio "Learning Named Entity Classifiers Using Support Vector machines", Computational Linguistics and Intelligent Text Processing Lecture Notes in Computer Science vol. 2945, 2004, pp. 158-167.*

Isozaki, "Efficient support vector classifiers for named entity recognition", Proceeding COLING '02 Proceedings of the 19th international conference on Computational linguistics—vol. 1, pp. 1-7.*

Thelen, "A bootstrapping method for learning semantic lexicons using extraction pattern contexts", Proceeding EMNLP '02 Proceedings of the ACL-02 conference on Empirical methods in natural language processing—vol. 10 pp. 214-221.*

Bum-Koog Kim et al., "A Study on Duration Length and Place of Feature Extraction for Phoneme Recognition", 1994, pp. 32-39.

* cited by examiner

APPARATUS AND METHOD FOR DETECTING NAMED ENTITY

CROSS-REFERENCE TO RELATED APPLICATION

This application is based on and claims priority from Korean Patent Application No. 10-2005-0102370, filed on Oct. 28, 2005, the disclosure of which is incorporated herein in its entirety by reference.

BACKGROUND OF THE INVENTION

1. Field of the Invention

The present invention relates to named-entity detection, and more particularly to an apparatus and method for detecting a named-entity based on a gradual learning technology regarding voice recognition or language processing.

2. Description of Related Art

In general, a named-entity refers to a classifiable word or series of words, such as, for example, the name of a person, an organization, a song, a broadcast, or a location.

For example, in the case of a sentence "Could you play the Lord of the Rings?", "Lord of the Rings" is a named-entity.

Named entities are frequently found in daily life. When discussing traffic information, about 74% of user utterances correspond to named-entities, and so do about 44% of broadcast utterances.

Particularly, named-entity detection is important in the field of knowledge learning related to spoken languages, and a large number of algorithms for named-entity detection have been proposed.

The most basic method for named-entity detection is based on a dictionary.

Here, a number of named-entities are pre-stored. A word or a group of words that are potential named entities are extracted from an inputted sentence and compared with the pre-stored named-entities.

However, named-entities have the characteristics of an open class, i.e., they vary over time. That is, they are created and disappear over time. Therefore, the conventional method based on a dictionary cannot fully process named-entities, which frequently change.

In an attempt to solve this problem, a method of detecting named-entities based on statistical techniques has been proposed. For example, U.S. Pat. No. 6,052,682 discloses a method of recognizing and classifying named-entities based on "uni-gram" and "bi-gram" by using a multi-step hidden Markov model.

However, the method disclosed in the above patent needs a corpus, which has a large amount tags attached thereto, for learning. This makes it difficult to reflect various colloquialisms, such as abbreviations. In addition, re-learning is necessary.

BRIEF SUMMARY

An aspect of the present invention provides an apparatus and method for detecting a named-entity by using an initial learning example and a feature set in conformity with an algorithm based on Bayesian learning so that the probability of detecting a named-entity is updated gradually.

Another aspect provides a named-entity detection apparatus including a candidate-named-entity extraction module for detecting a candidate-named-entity based on an initial learning example and feature information regarding morphemes constituting an inputted sentence, the candidate-named-entity extraction module providing a tagged sentence including the detected candidate-named-entity; a storage module that stores information regarding a named-entity dictionary and a rule; and a learning-example-regeneration module that determines whether the candidate-named-entity included in the provided sentence is a valid named-entity, based on the named-entity dictionary and the rule, the learning-example-regeneration module providing the sentence as a learning example, based on a determination result, so that candidate-named-entity detection probability is gradually updated.

In accordance with another aspect of the present invention, there is provided a named-entity detection method including: detecting a candidate-named-entity based on an initial learning example and feature information regarding morphemes constituting an inputted sentence and providing a tagged sentence including the detected candidate-named-entity; finally determining whether the candidate-named-entity included in the provided sentence is a valid named-entity, based on pre-stored named-entity dictionary and rule, and providing the sentence as a learning example, based on a determination result, so that candidate-named-entity detection probability is gradually updated.

According to another aspect of the present invention, there is provided a named-entity detection system including: a voice-recognition unit converting an utterance into a recognized sentence; a morpheme analysis unit analyzing morphemes of the recognized sentence; and a named-entity detection unit detecting named-entities from the analyzed sentence, the named-entity detection unit which includes a model-learning module learning a model for named-entity extraction from at least one example, a named-entity candidate extraction module extracting all possible named-entity candidates based on feature information regarding morphemes constituting the recognized sentence and either a model learned by the model-learning module or an initial learning example, and providing a tagged sentence including all the extracted named-entity candidates, a storage module storing a named-entity dictionary and a rule, and a learning-example-regeneration module determining whether each named-entity candidate included in the provided tagged sentence is a valid named-entity, based on the named-entity dictionary and the rule, and providing the tagged sentence as a learning example to the model-learning module, based on a determination result, so as to increase a probability of named-entity candidate detection.

According to another aspect of the present invention, there is provided a named-entity detection method including: extracting a candidate named-entity, which is a potential named-entity, from a user utterance including a sentence using an initial learning example and feature information regarding morphemes constituting the sentence; determining whether a candidate named-entity matches an item registered in a dictionary; verifying the candidate named-entity as a named-entity when the candidate named-entity matches an item registered in the dictionary and providing the candidate named-entity as a new positive learning example to a learning model; and determining whether the candidate named-entity violates a rule when the candidate named-entity does not match an item registered in the dictionary, providing the candidate named-entity as a new negative learning example to the learning model when the candidate violates a rule, and verifying the candidate named-entity as a named-entity when the candidate named-entity does not violate any rule.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
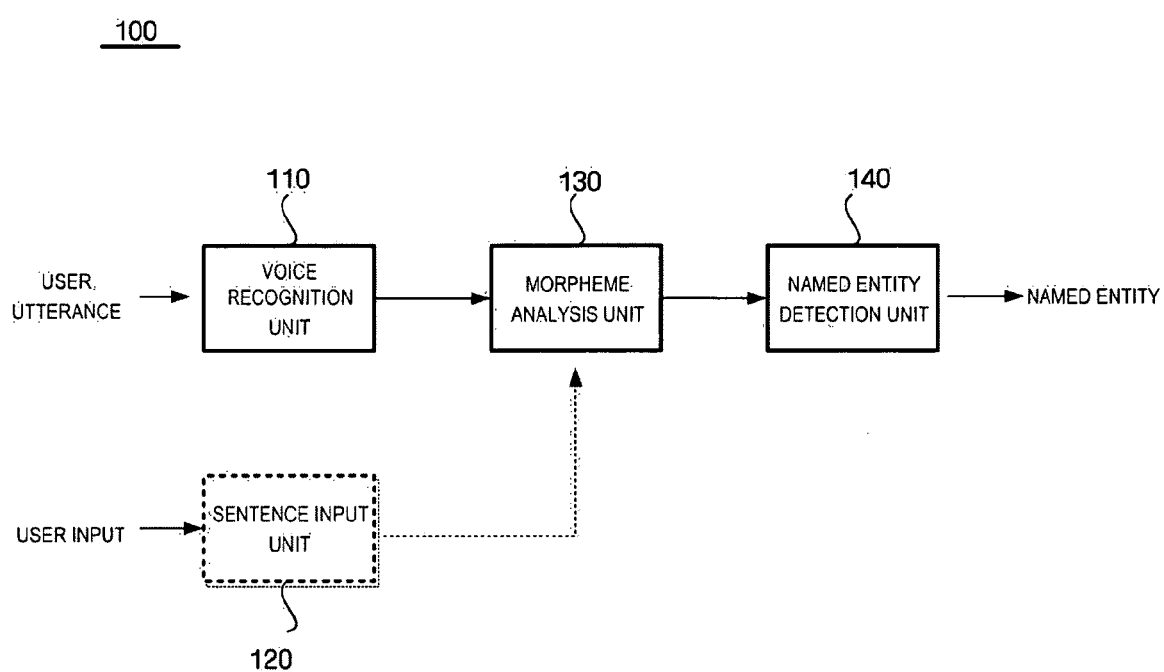
FIG. 1 is a block diagram showing the structure of a named-entity detection system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention is described hereinafter with reference to flowchart illustrations of an apparatus and method for detecting a named-entity according to embodiments of the invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operations to be performed in the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur in an order that differs from that described or illustrated. For example, two blocks shown in succession may in fact be executed substantially concurrently or the blocks may sometimes be executed in reverse order depending upon the functionality involved.

FIG. 1 is a block diagram showing the structure of a named-entity detection system according to an embodiment of the present invention.

Referring to FIG. 1, a named-entity detection system 100 according to the present embodiment includes a voice-recognition unit 110, a morpheme analysis unit 130, and a named-entity detection unit 140. The named-entity detection system 100 may further include a sentence-input unit 120. However, as explained below, the sentence-input unit 120 is optional.

The voice-recognition unit 110 converts a user's utterance (i.e., speech) into a corresponding recognized sentence. The morpheme analysis unit 130 analyzes the morphemes of the recognized sentence.

The named-entity detection system 100 can detect named-entities not only from a user's utterances, but also from sentences inputted by the user.

To this end, the named-entity detection system 100 may further include a sentence-input unit 120, which receives sentence input from the user. The morpheme analysis unit 130 analyzes the morphemes of inputted sentences. The sentence-input unit 120 may be any type of means used by the user to input sentences, such as, by way of non-limiting examples, a keyboard or a mouse.

After a sentence is inputted by the voice-recognition unit 110 or the sentence-input unit 120 and is subjected to morpheme analysis by the morpheme analysis unit 130, the named-entity detection unit 140 detects named-entities from the sentence recognized or input.

The configuration and function of the named-entity detection unit 140 will be described in detail in the following with reference to FIG. 2.

Figure 2:
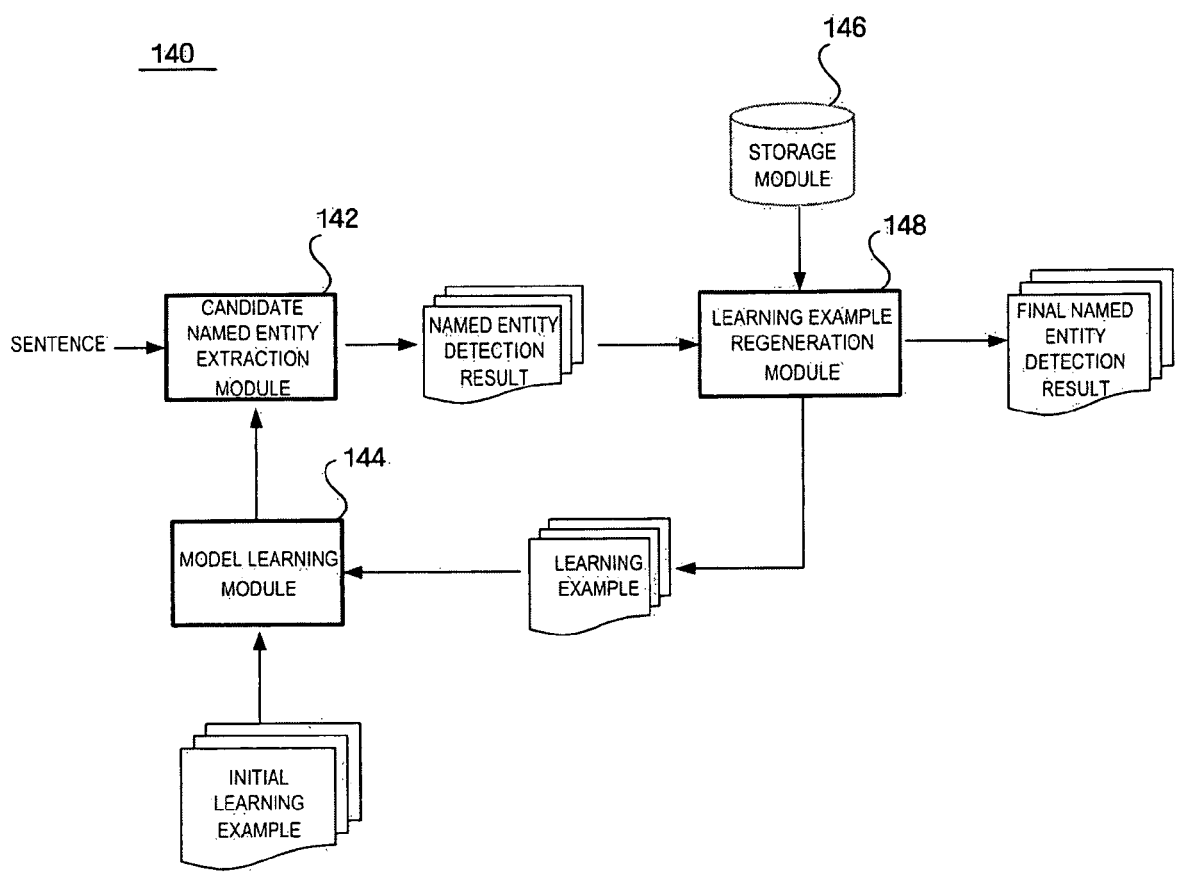
FIG. 2 is a block diagram showing the structure of a named-entity detection apparatus according to an embodiment of the present invention.

Referring to FIG. 2, the named-entity detection unit 140 according to the present embodiment includes a candidate-named-entity extraction module 142, a model-learning module 144, a storage module 146, and a learning-example-regeneration module 148.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The candidate-named-entity extraction module 142 extracts candidate named-entities (i.e., potential named-entities) from a sentence provided by the morpheme analysis unit 130 (shown in FIG. 1) based on a model learned by the model-learning module 144.

The model-learning module 144 learns a model for named-entity extraction by using various learning examples. For example, a Bayesian learning model may be used.

The storage module 146 stores information regarding a named-entity dictionary and rules used to determine whether or not the candidate named-entities, which have been extracted by the candidate-named-entity extraction module 142, can be actual named-entities.

Based on the information stored in the storage unit 146, the learning-example-regeneration module 148 determines whether or not the candidate named-entities, which have been extracted by the candidate-named-entity extraction unit 142, can be actual named-entities. Based on the determination result, the learning-example-regeneration module 148 regenerates a learning example and reflects it in the learning model learned by the learning module 144.

The model-learning module 144 learns an initial learning example in an initialization operation of the named-entity detection unit 140 and applies the initial learning example when the candidate-named-entity extraction module 142 extracts candidate named-entities. Then, the model-learning module 144 learns a learning example provided by the learning-example-regeneration module 148.

The operation of each module constituting the named-entity detection unit 140 will now be described in detail with reference to a flowchart shown in FIG. 3.

Figure 3:
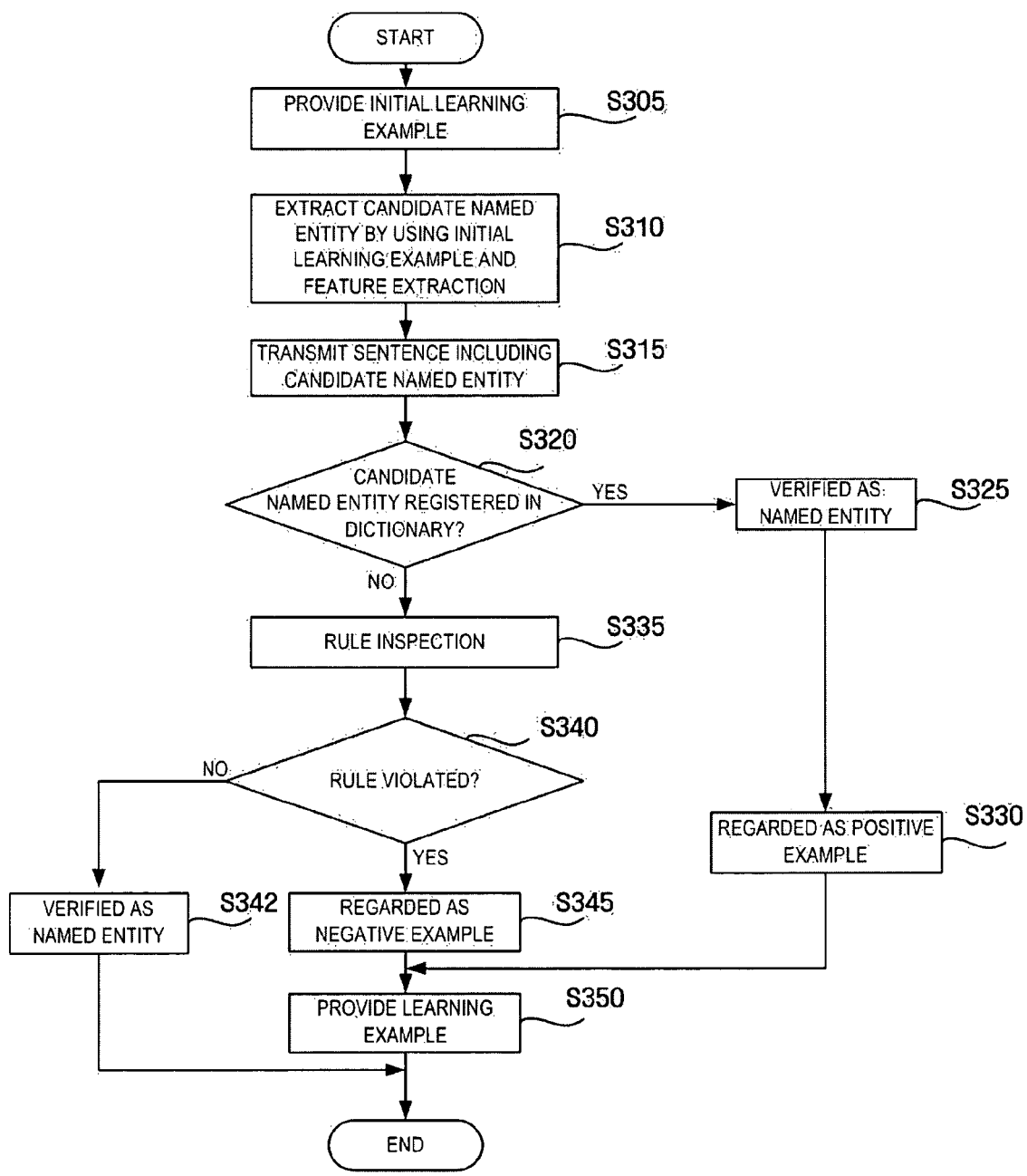
FIG. 3 is a flowchart showing a named-entity detection method according to an embodiment of the present invention.

Referring to FIGS. 2 and 3, after receiving an initial learning example, the model-learning module 144 classifies each word, which constitutes the initial learning example, into one of three types of classes and adds a corresponding tag S305. According to the present embodiment, the classes include class B, which corresponds to the first word of a series of words regarded as named-entities, class I, which corresponds to a word positioned next to class B and regarded as a named-entity, and class O, which is not regarded as a named-entity.

For instance, when the initial learning example is "MBC-esu-ha-neun-shinip-sawon-myut-si-e-shijakha-ni? (What time does "Newcomer" begin on MBC?)", tags can be added to corresponding words in the following manner.

MBC, esu, ha, neun: class O
shinip: class B
sawon: class I
myut, si, e, shijakha, ni: class O In this case, shinip-sawon, which is composed of a class B word and a class I word, constitutes a single named-entity.

The candidate-named-entity extraction module 142 receives input of a sentence, which has been classified into morphemes. Based on the learning done by the model-learning module 144, the candidate-named-entity extraction module 142 determines the class of each morpheme constituting the inputted sentence and, based on the determined class, extracts candidate named-entities, which are potential named-entities S310.

A standard is necessary to determine the class and, hereinafter, will be referred to a feature.

Features include a word feature, a part-of-speech feature, a concept feature, an adjacent verb feature, and an adjacent verb concept feature.

The word feature, labeled w, indicates the word of a current morpheme, as well as three morphemes before and after it, respectively.

The part-of-speech feature, labeled p, indicates the part-of-speech of a current morpheme, as well as three morphemes before and after it, respectively.

The concept feature, labeled o, indicates the ontological concept information of a current morpheme, as well as three morphemes before and after it, respectively.

The adjacent verb feature, labeled v, indicates the word of a verb, which appears first after a current word.

The adjacent verb concept feature, labeled vo, indicates the ontological concept of an adjacent verb.

For instance, in order to determine the class of sawon in the initial learning example, the following features can be extracted.

Word feature: ha/-3, neun/-2, shinip/-1, sawon/0, myut/1, si/2, e/3
Part-of-speech feature: VV/-3, EFD/-2, NN/-1, NN/0, DU/1, NNBU/2, PA/3
Concept feature: S_BR/-3, NULL/-2, NULL/-1, NULL/0, S_WHAT/1, S_TM/2, NULL/3
Adjacent verb: shijakha
Adjacent verb concept: S-BG Here, VV refers to a normal verb; EFD refers to an ending form determiner; NN refers to a normal noun; DU refers to a determiner; NNBU refers to a dependant noun; PA refers to a postposition; S_BR semantically refers to a broadcast; WHAT semantically refers to 'what'; S_TM semantically refers to time; and S_BG semantically refers to beginning.

As such, each word constituting a sentence is categorized into one of the three classes based on the feature.

Meanwhile, a Bayesian learning model may be used as a classification model for determining the class based on the feature, as given below.

$$C(w_o) = \arg\max_{c \in C} P(c|F)$$
$$= \arg\max_{c \in C} \frac{P(c)P(F|c)}{P(F)}$$
$$= \arg\max_{c \in C} \left(P(c)P(v|c)P(vo|c) \prod_{i=-k}^{k} P(w_i, p_i, o_i|c)\right)$$
$$= \arg\max_{c \in C} \log\left(P(c)P(v|c)P(vo|c) \prod_{i=-k}^{k} P(w_i|c)P(p_i|c)P(o_i|c)\right)$$
$$= \arg\max_{c \in C} (\log P(c) + \log P(v|c) + \log P(vo|c) +$$
$$\log \prod_{i=-k}^{k} P(w_i|c)P(p_i|c)P(o_i|c)$$

When a word to be currently classified is $w_o$, it is clear from the first line in the above equation that, when a feature extracted from a context currently containing the word is F, the word is given a tag, which is determined by obtaining probabilities that the word will belong to classes B, I, and O, respectively, and selecting a tag corresponding to the largest probability. In the above equation, C refers to a possible tag set {B, I, O}, and F refers to any of the above-mentioned five features.

The second line in the above equation is an expansion of the first line according to Bayes' theorem. This is because the value of P(c|F) in the first line is difficult to obtain directly. Therefore, P(c), P(F|c), and P(F) in the expansion are used to obtain P(c|F).

The third line in the equation is an expansion of F in the second line into word (w), part-of-speech (p), concept (o), adjacent verb (v), and adjacent verb concept (vo) features. This is because the word (w), part-of-speech (p), and concept (o) features exist as many as k on left and right sides, respectively (i.e. from −k to k), while there are a single adjacent verb (v) feature and a single adjacent verb concept (vo) feature. It is to be noted that P(F), which is a denominator in the second line, is omitted in the third line, because it does not affect class determination.

The fourth line is obtained by substituting $P(w_i, p_i, o_i|c)$ in the third line with values, which are easier to obtain, on the assumption of independence. More particularly, assuming that $w_i$, $p_i$, and $o_i$ are independent of one another, $P(w_i, p_i, o_i|c)$ may be expressed as a product of $P(w_i|c)$, $P(p_i|c)$, and $P(o_i|c)$.

The last line is a logarithm expansion.

After determining the class of each word constituting the sentence, which has been inputted to the candidate-named-entity extraction module 142, by using the initial learning example and the Bayesian learning model, candidate named-entities are detected based on the determined classes. As a result, a sentence tagged with determined classes is transmitted to the learning-example-regeneration module 148 S315.

Based on the named-entity dictionary and rules stored in the storage module 146, the learning-example-regeneration module 148 finally determines whether or not the candidate named-entities, which are included in the tagged sentence, can be regarded as actual named-entities.

The storage module 146 stores a dictionary having a list of unambiguous named-entities and rules used as a standard for named-entity determination.

Among the candidate named-entities extracted by the candidate-named-entity extraction module 142, proper noun type named-entities or relatively long named-entities may be regarded unambiguous, as long as they have no ambiguity in meaning. In the case of named-entities regarding broadcasts, for example, unambiguous named-entities may include "I'm sorry, but I love you.", "Dae-jang-geum", "Lovers in Paris", "100-minute discussion", and "Nightline".

The rules include an error inspection rule using a meaning string pattern and an error inspection rule using an excluded word list.

As an example of the error inspection rule using a meaning string pattern, a bi-gram meaning string pattern is extracted from " . . . bangsongha(TV_V_BROADCAST)neun drama(/TV_N_DRAMA) . . . ". When postposition neun is excluded, "TV_V_BROADCAST+TV_N_DRAMA" is not regarded as a named-entity.

Another example of error pattern includes "TV_BROADCAST+TV_KEYWORD" and "TV_BROADCAST".

An example of the error inspection rule using an excluded word list is as follow: when an excluded word dictionary is R, and there is a named-entity N composed of word-phrases n1, n2, . . . nn, N is not regarded as a named-entity if there exists a word-phrase ni included in R. The excluded word dictionary may be, for example, "pyunsung, drama, documentary, jom, du, . . . ". In addition, the rules may include a verification rule based on a part-of-speech/part-of-speech string pattern and a verification rule using meaning information.

When a candidate-named-entity matches an item registered in the dictionary, it is finally verified (operations S320 and S325), and the sentence including it is regarded as a positive example operation S330. The model-learning module 144 is provided with the positive example as a new learning example operation S350.

When the candidate-named-entity does not match any item registered in the dictionary in operation S320, it is determined whether or not the candidate violates any rule stored in the storage module 146 operation S335. If the candidate violates a rule, it is regarded as a negative example (operations S340 and S345). The model-learning module 144 is provided with the negative example as a new learning example operation S350. If the candidate is determined not to violate any rule in operation S340, it is verified as a named-entity, but is not used for model-learning operation S342.

The positive or negative example, with which the model-learning module 144 is provided as a new learning example, is reflected in the Bayesian model so that the probability of the above-mentioned equation is modified. As such, the probability of detecting a named-entity is gradually updated and improved.

As an experiment of this embodiment of the present invention, 200 colloquial sentences were used as an initial learning example, and 500, 1000, and 1500 colloquial sentences were used for gradual learning. The result is given in the following table.

TABLE 1

Experimental Results

| | B | | | I | | | O | | |
|---|---|---|---|---|---|---|---|---|---|
| | R | P | F | R | P | F | R | P | F |
| | 0.57 | 0.77 | 0.66 | 0.58 | 0.99 | 0.73 | 0.99 | 0.95 | 0.97 |
| | 0.64 | 0.79 | 0.71 | 0.66 | 0.92 | 0.77 | 0.99 | 0.96 | 0.98 |
| | 0.68 | 0.77 | 0.72 | 0.69 | 0.90 | 0.78 | 0.98 | 0.96 | 0.97 |
| | 0.69 | 0.75 | 0.72 | 0.71 | 0.89 | 0.79 | 0.98 | 0.97 | 0.98 |

Wherein, R (recall) refers to a probability that a named-entity included in a corresponding class will be selected, P (precision) refers to a probability that a corresponding class will be detected from the selected named-entity, and F refers to a performance index considering both R and P performances.

It is clear from Table 1 that, according to the present embodiment, the performance index F for B and I classes gradually increases in proportion to the number of colloquial sentences.

Figure 4:
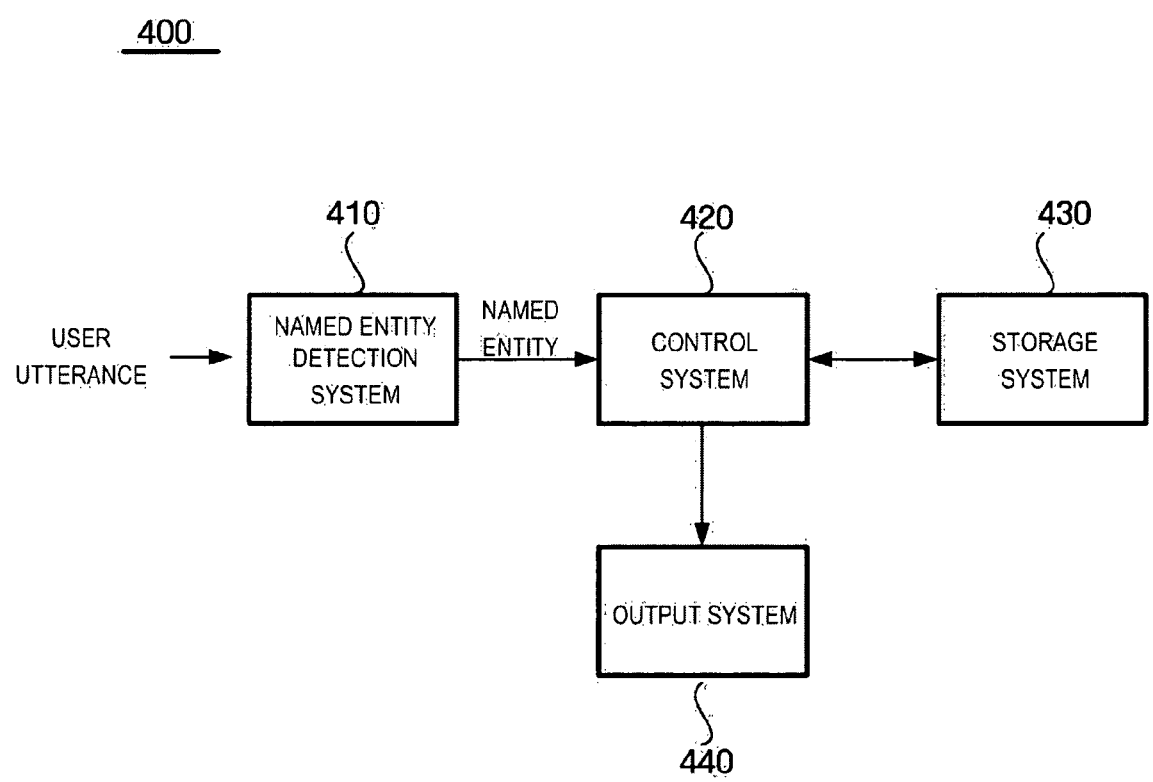
FIG. 4 is a block diagram showing the structure of a voice recognition system according to an embodiment of the present invention.

FIG. 4 is a block diagram showing the structure of a voice conversation system according to an embodiment of the present invention.

Referring to FIG. 4, a voice conversation system 400 according to the present embodiment includes a named-entity detection system 410, a control system 420, a storage system 430, and an output system 440.

The named-entity detection system 410 has a structure corresponding to that of the named-entity detection system 100 shown in FIG. 1. Particularly, the named-entity detection system 410 extracts named-entities from a user's utterances and provides them as previously described.

The control system 420 uses named-entities received from the named-entity detection system 410, and performs corresponding functions for the voice conversation system 400.

For example, when the voice conversation system 400 is configured so as to retrieve information corresponding named-entities and provide it to the user, the control system 420 uses named-entities received from the named-entity detection system 410 and retrieves information regarding the named-entities from the storage system 430. The retrieved information is provided to the user via the output system 440.

The storage system 430 includes various media capable of storing digital information, as well as external storage media or external server connected to the control system 420 via a wired/wireless network.

The output system 440 is used to provide the user with the retrieved information, and the configuration of the output system 440 may depend on the type of retrieved information. For example, when the retrieved information is visual information (e.g. texts or images), the output system 440 is configured as a display device. When the retrieved information is audio information (e.g. music or sound), the output system 440 is configured as a speaker. When the retrieved information is haptic information, the output device 440 is configured as a haptic device. When the retrieved information is mobile image information, the output device 440 may be configured as both a display and a speaker.

Efficient named-entity extraction according to the present embodiment, contributes to the improvement of performance of the voice conversation system 400 shown in FIG. 4.

The above-described embodiments of the present invention provide a continual learning effect in named-entity detection by means of gradual learning.

In addition, the above-described embodiments of the present invention use a corpus having a small number of tags attached thereto so that named-entity detection can be performed more efficiently.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A named-entity detection apparatus comprising:
a candidate-named-entity extraction module detecting a candidate-named-entity based on an initial learning example and feature information regarding morphemes constituting an inputted sentence, the candidate-named-entity extraction module providing a tagged sentence including the detected candidate-named-entity, wherein the candidate-named-entity extraction module is hardware module;
a storage module storing information regarding a named-entity dictionary and a rule; and
a learning-example-regeneration module determining whether the candidate-named-entity included in the provided sentence is a valid named-entity, based on the named-entity dictionary and the rule, and providing the sentence as a learning example, based on a determination result, so that a probability of named-entity candidate detection is gradually updated,
wherein the candidate-named-entity extraction module determines a class of each morpheme by using a learning model based on the feature information, and provides a tagged sentence by adding determined class information as a tag,
wherein the learning example provided by the learning-example-regeneration module is reflected in the learning module as a negative example when the rule is violated,
wherein the probability of detecting the named-entity of the candidate-named-entity extraction module is gradually updated in the learning module when the learning example is a negative example,
wherein the feature information comprises a word feature, a part-of-speech feature, a concept feature, an adjacent verb feature, and an adjacent verb concept feature, and
wherein the concept feature comprises ontological concept information of a current morpheme as well as three morphemes before and after the current morpheme.

2. The named-entity detection apparatus of claim 1, wherein the learning model comprises a Bayesian learning model.

3. The named-entity detection apparatus of claim 1, wherein the named-entity dictionary comprises unambiguous named-entities.

4. The named-entity detection apparatus of claim 1, wherein the rule comprises an error inspection rule using a meaning string pattern.

5. The named-entity detection apparatus of claim 1, wherein the rule comprises an error inspection rule using an excluded word list.

6. The named-entity detection apparatus of claim 1, wherein the learning-example-regeneration module provides the sentence including the candidate-named-entity as a positive learning example when the candidate-named-entity is included in the named-entity dictionary.

7. A named-entity detection method comprising:
detecting a candidate-named-entity based on an initial learning example and feature information regarding morphemes constituting an inputted sentence and providing a tagged sentence including the detected candidate-named-entity by a candidate-named-entity extraction module, wherein the candidate-named entity extraction module is a hardware module;
finally determining whether the candidate-named-entity included in the provided sentence is a valid named-entity, based on pre-stored named-entity dictionary and rule by learning-example regeneration module, and
providing the sentence as a learning example, based on a determination result, so that a probability of candidate-named-entity detection is gradually updated by the learning-example-regeneration module,
wherein, in the detecting, a class of each morpheme is determined by using a learning model based on the feature information, and a tagged sentence is provided after adding determined class information as a tag,
wherein, in the providing, the learning example is reflected in the learning model as a negative example when the rule is violated,
wherein the probability of detecting the named-entity of the learning-example-regeneration module is gradually updated in the learning module when the learning example is a negative example,
wherein the feature information comprises a word feature, a part-of-speech feature, a concept feature, an adjacent verb feature, and an adjacent verb concept feature, and
wherein the concept feature comprises ontological concept information of a current morpheme as well as three morphemes before and after the current morpheme.

8. The named-entity detection method of claim 7, wherein the learning model comprises a Bayesian learning model.

9. The named-entity detection method of claim 7, wherein the named-entity dictionary comprises unambiguous named-entities.

10. The named-entity detection method of claim 7, wherein the rule comprises an error inspection rule using a meaning string pattern.

11. The named-entity detection method of claim 7, wherein the rule comprises an error inspection rule using an excluded word list.

12. The named-entity detection method of claim 7, wherein, in the providing, the sentence including the candidate-named-entity is provided as a positive learning example when the candidate-named-entity is included in the named-entity dictionary.

13. A named-entity detection system comprising:
a voice-recognition unit converting an utterance into a recognized sentence;
a morpheme analysis unit analyzing morphemes of the recognized sentence; and
a named-entity detection unit detecting named-entities from the analyzed sentence, the named-entity detection unit comprising
a model-learning module learning a model for named-entity extraction from at least one example, a named-entity candidate extraction module extracting all possible named-entity candidates based on feature information regarding morphemes constituting the recognized sentence and either a model learned by the model-learning module or an initial learning example, and providing a tagged sentence including all the extracted named-entity candidates, a storage module storing a named-entity dictionary and a rule, and a learning-example-regeneration module determining whether the at least one named-entity candidate included in the provided tagged sentence is a valid named-entity, based on the named-entity dictionary and the rule, and providing the tagged sentence as a learning example to the model-learning module, based on a determination result, so as to increase a probability of named-entity candidate detection, wherein the named-entity candidate extraction module is a hardware module; and wherein, the learning example is reflected in the model-learning module as a negative example when the rule is violated, wherein the probability of detecting the named-entity of the named-entity detection unit is gradually updated in the learning module when the learning example is a negative example, wherein the feature information comprises a word feature, a part-of-speech feature, a concept feature, an adjacent verb feature, and an adjacent verb concept feature, and wherein the concept feature comprises ontological concept information of a current morpheme as well as three morphemes before and after the current morpheme.

14. The system of claim 13, further comprising a sentence-input unit receiving an inputted sentence, wherein the morpheme analysis unit analyzes morphemes of the inputted sentence.

15. A named-entity detection method comprising:

extracting a candidate named-entity, which is a potential named-entity, from a user utterance including a sentence using an initial learning example and feature information regarding morphemes constituting the sentence by a candidate-named-entity extraction module, wherein the candidate-named-entity extraction module is a hardware module;

determining whether a candidate named-entity matches an item registered in a dictionary by a learning-example-regeneration module;

verifying the candidate named-entity as a named-entity when the candidate named-entity matches an item registered in the dictionary and providing the candidate named-entity as a new positive learning example to a learning model by the learning-example-regeneration module; and determining whether the candidate named-entity violates a rule when the candidate named-entity does not match an item registered in the dictionary, providing the candidate named-entity as a new negative learning example to the learning model when the candidate violates a rule, updating the probability of detecting the named-entity of the learning-example-regeneration module gradually when the new negative learning example violates the rule, and verifying the candidate named-entity as a named-entity when the candidate named-entity does not violate any rule, wherein the feature information comprises a word feature, a part-of-speech feature, a concept feature, an adjacent verb feature, and an adjacent verb concept feature, and wherein the concept feature comprises ontological concept information of a current morpheme as well as three morphemes before and after the current morpheme.

16. The method of claim 15, wherein the rule is an error inspection rule using at least one selected from the group consisting of a meaning string pattern and an excluded word list.

17. A non-transitory computer-readable storage medium encoded with processing instructions for causing a processor to execute the method of claim 7.

18. A non-transitory computer-readable storage medium encoded with processing instructions for causing a processor to execute the method of claim 15.

* * * * *